Sept. 23, 1952  W. R. CUSTER  2,611,556
JET-PROPELLED AIRCRAFT WITH LIFT CHANNELS
Filed Sept. 19, 1947
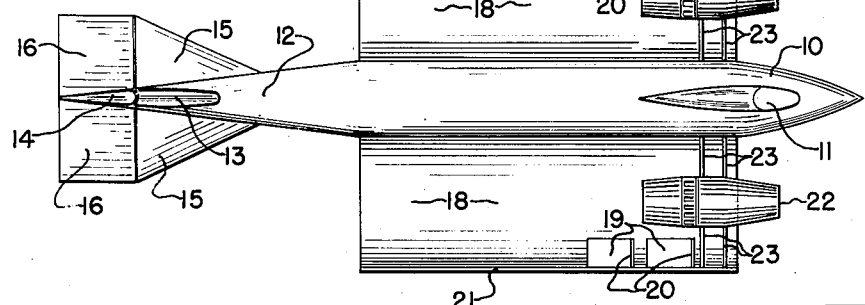
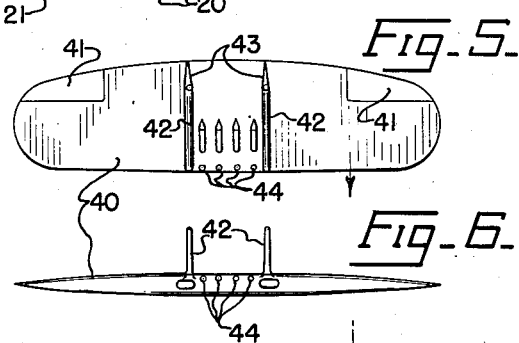
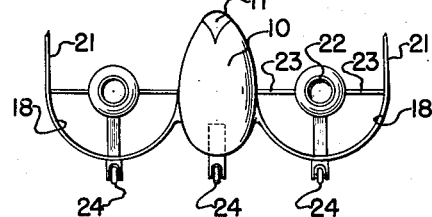
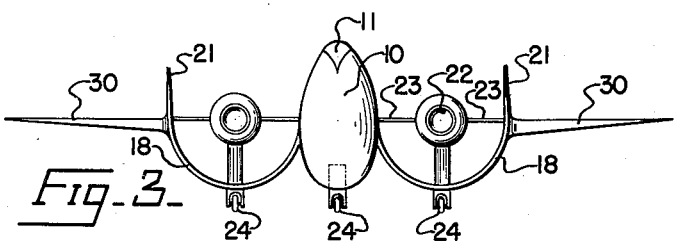
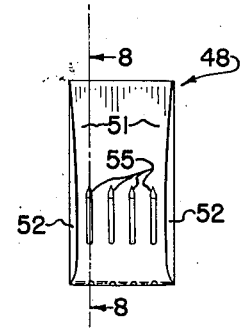
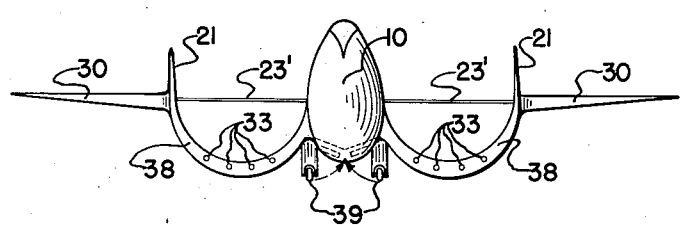
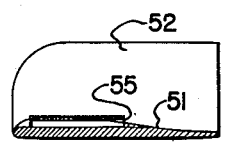
INVENTOR.
W. R. CUSTER.
BY
Harvey O'Connell
ATTORNEYS.

Patented Sept. 23, 1952

2,611,556

UNITED STATES PATENT OFFICE 2,611,556

JET-PROPELLED AIRCRAFT WITH LIFT CHANNELS

Willard R. Custer, Hagerstown, Md.

Application September 19, 1947, Serial No. 775,107

5 Claims. (Cl. 244—12)

This invention relates to rocket and jet propelled aircraft including pilotless missiles, and more particularly to such aircraft employing the Custer channel wing.

As is well known in the art, rockets and jets employed as aircraft propellants are most efficient at very high speeds. However, all aircraft in taking off must start from zero speed and it is inherently difficult to achieve an aircraft with high lift at low speeds and yet capable of very high speeds in flight. The conventional airplane wing is airfoiled in shape to provide a lifting force; the greater the airfoiling, the greater the lift. At speeds in the transonic and supersonic ranges the airfoiled wing creates prohibitive aerodynamical disturbances. For this reason it is necessary to use a wing having a sharp leading edge for transonic speeds and a wing having a practically uniform minimum thickness for supersonic speeds.

Since a wing designed for transonic and supersonic speeds has very little lifting force at launching speeds, it has been necessary to launch such missiles in an almost vertical direction. For example, the V-2 missile used against England in World War II was sent up about sixty miles in order to reach a target only about half that far away. The Custer channel wing has the characteristic of providing high static lifting power, in a longitudinal position. An aircraft employing the Custer channel wing has, with adequate engine equipment, enough lifting power to lift the craft vertically. Unlike the conventional airfoiled wing, the lifting power of the Custer channel wing is greatest at zero speed when lifting power is needed most.

By using the Custer channel wing in combination with jet or rocket propulsion, it is possible to provide an aircraft suitable for flight at transonic and supersonic speeds which at the same time has high lift characteristics at the low speeds during take-off and landing, and this is the general object of the invention.

Other objects will be apparent from the following description taken with the appended drawings wherein:

Figure 1 is a top plan view of an airplane or missile constructed according to the teaching of the invention, a jet or rocket motor being mounted in each channel and coaxial therewith;

Figure 2 is a front elevational view of the same;

Figure 3 is a front elevational view of a modified form of the invention wherein wings extend spanwise from the channels;

Figure 4 is a front elevational view of another modified form of the invention embodying a plurality of jets mounted in the bottom walls of the channels;

Figure 5 is a top plan view of another modified form of the invention in the nature of a flying wing with fins on the wing forming a channel;

Figure 6 is a front elevational view of the same;

Figure 7 is a top plan view of a further modification of the invention wherein I employ a square-cornered channel per se having a plurality of ram jets or rockets mounted in the bottom of the channel;

Figure 8 is a cross sectional view of the same taken longitudinally of the channel on the line 8—8 of Figure 7 looking in the direction of the arrows.

Referring now in greater detail to the drawings, Figures 1 and 2 show a presently preferred form of the invention wherein fuselage 10 has a cockpit 11 or control cabin tail 12, fin 13, rudder 14, stabilizers 15, and elevators 16. On each side of the fuselage is a channel 18, semi-cylindrical in shape, opening upwardly and at both ends. Each channel is of constant radius throughout and is elongated for high speed jet planes. Extending inwardly from the outboard edges of each channel are horizontal ailerons 19 hinged at leading edges 20. Upwardly-extending fins or baffles 21 issue from the outboard edges of channels 18 and serve to aerodynamically isolate the channels. Jet propulsion motors 22 are supported in the channels 18 and held coaxially therein by means of braces 23. The landing gear comprises wheels 24 mounted beneath the channels and fuselage.

In the operation of the embodiment of the invention shown in Figures 1 and 2, the jet motors 22 create a blast of air in the channels 18 thereby inducing static lift, i. e., lifting force when the airplane is not in motion. The lifting force is a function of the difference in speeds of the air and gases in the channel and the air beneath the channel. The lifting force is greatest when the aircraft is not moving or moving at low speeds when lift is needed most. Because of these characteristics, the aircraft or missile may be started or aimed in a horizontal position directly at the objective, and will quickly gain altitude as it gains forward speed until a balancing of the forces of lift and gravitation results in flight at a constant altitude. The aircraft or missile does not depend on any airfoiled surfaces for lift, and the absence of airfoiled surfaces permits flight at transonic and supersonic speeds.

It is of course to be understood that the control surfaces of the aircraft or missle permit the propulsive forces of the jet motors to be utilized for gaining altitude as well as forward speed by merely inclining the aircraft upwardly. The control surfaces provide for maneuvering the aircraft in the conventional manner.

The modification of the invention shown in Figure 3 differs from the embodiment thus far described in that airfoiled wings 30 are disposed contiguous with and spanwise from the channels 18. The airfoiled wings 30 provide additional lift at a sacrifice of maximum speed. The channels 18 may also be airfoiled in chordwise cross section to provide additional lift. It is apparent that various combinations of channels and wings may be employed depending on speed and lift characteristics desired.

Another modification of the invention is shown in Figure 4, wherein a plurality of ram jets or rockets 33 are mounted in the fore edges of the base of the airfoiled channels. The jets are positioned to exhaust in the channels. The jets 33 produce a blast of air and gases in the channels resulting in lifting and propulsive forces. In this form of the invention both the wings and the channels 38 are preferably airfoiled in shape. Braces 23' extend across the tops of the channels. A retractible landing gear 39 is carried by and extends from the fuselage 10.

The modification of the invention shown in Figures 5 and 6 consists of a flying wing provided with conventional ailerons 41. Upright spaced fins or baffles 42, issuing from the top of the wing, form a channel therebetween. Rudders 43, at the aft edge of fins 42, provide means for the usual direction control. Ram jets or rockets 44 are imbedded in the wing between fins 42 and are effective to produce a blast of air and gases in the channel, resulting in lifting and propulsive forces.

The rectangular channel 48 illustrated in Figures 7 and 8 comprises a bottom 51 having ram jets or rockets 55 imbedded therein. Fins or baffles 52 form a channel therebetween. It is within the contemplation of this invention that the rectangular channel 48 be used in aircraft of various types, as, for example, in place of the semi-cylindrical channels 38 of the embodiment shown in Figure 4. A plurality of such rectangular channels may be formed on the tops of wings on various types of aircraft thereby multiplying the resulting lifting force.

While I have shown and described several forms of my invention, it is to be understood that I am not to be limited thereto and that many changes could be made without departing from the scope of the claims hereto appended.

What I claim is:

1. An aircraft comprising an upwardly-opening semi-cylindrical channel disposed in the direction of flight, and a jet motor mounted in the channel coaxial therewith.

2. An aircraft comprising a fuselage, an upwardly-opening channel on each side of the fuselage, the channels being semi-cylindrical in shape and having their axes disposed in the fore and aft direction, and a jet motor mounted in each channel and coaxial therewith.

3. An aircraft comprising a fuselage, an upwardly-opening semi-cylindrical channel on each side of the fuselage, a fin extending upwardly from the outboard edge of each channel, and jet propulsion means mounted in each channel coaxial therewith.

4. An aircraft comprising an upwardly opening channel in the direction of flight, a jet motor mounted in the channel coaxial therewith and in spaced relation to the sides of the latter, and direction control surfaces mounted on the inner walls of the channel, certain of the surfaces being interposed between the motor and the channel walls.

5. An aircraft comprising an upwardly opening channel in the direction of flight, and a jet motor mounted in the fore end of the channel coaxial with the latter and in spaced relation to the channel sides, the air intake terminal of the motor being in advance of the leading edge of the channel.

WILLARD R. CUSTER.

REFERENCES CITED

The following references are of record in the file of this patent:

UNITED STATES PATENTS

| Number | Name | Date |
| --- | --- | --- |
| 1,353,955 | Hering | Sept. 28, 1920 |
| 2,004,256 | Trey | June 11, 1935 |
| 2,085,761 | Lysholm | July 6, 1937 |
| 2,334,070 | Conley | Nov. 9, 1943 |
| 2,402,358 | Bauman | June 18, 1946 |
| 2,412,646 | Northrop | Dec. 7, 1946 |
| 2,437,732 | Ferrel | Mar. 16, 1948 |

FOREIGN PATENTS

| Number | Country | Date |
| --- | --- | --- |
| 29,364 | Great Britain | 1911 |